United States Patent
Miura (10) Patent No.: US 12,481,209 B2
(45) Date of Patent: Nov. 25, 2025

(54) SUPPORT APPARATUS (71) Applicant: CASIO COMPUTER CO., LTD., Tokyo (JP)

(72) Inventor: Kohei Miura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 74 days.

(21) Appl. No.: 18/530,983

(22) Filed: Dec. 6, 2023

(65) Prior Publication Data
US 2024/0192580 A1 Jun. 13, 2024

(30) Foreign Application Priority Data
Dec. 7, 2022 (JP) .................................. 2022-195323

(51) Int. Cl.
*G03B 21/54* (2006.01)

(52) U.S. Cl.
CPC .................................... *G03B 21/54* (2013.01)

(58) Field of Classification Search
CPC ............................. G03B 21/54; G03B 21/145
USPC ...................... 248/558, 672, 354.5; 220/660
See application file for complete search history.

(56) References Cited

U.S. PATENT DOCUMENTS

| | | | | |
|---|---|---|---|---|
| 4,421,290 A * | 12/1983 | Frank | ...................... | E02F 9/085 248/632 |
| 4,422,610 A * | 12/1983 | Hunt | ...................... | A47G 7/047 248/311.2 |
| 5,351,926 A * | 10/1994 | Moses | ................... | A61B 6/4464 248/343 |
| 7,252,276 B2 * | 8/2007 | Acketts | ................... | G07F 19/20 248/346.02 |
| 9,069,527 B2 * | 6/2015 | Leong | .................... | G06F 1/1632 |
| 11,706,893 B2 * | 7/2023 | Li | ........................ | F16M 13/022 248/558 |
| 2014/0146296 A1 * | 5/2014 | Tian | ...................... | G03B 21/145 353/100 |
| 2019/0372259 A1 * | 12/2019 | Schneider | .............. | H01R 13/04 |
| 2024/0125423 A1 * | 4/2024 | Zhang | .................... | G03B 21/14 |
| 2024/0192580 A1 * | 6/2024 | Miura | ................... | G03B 21/145 |

FOREIGN PATENT DOCUMENTS

| | | |
|---|---|---|
| JP | 06-138433 A | 5/1994 |
| JP | 2001-358469 A | 12/2001 |
| JP | 2005-010391 A | 1/2005 |
| JP | 2008-228826 A | 10/2008 |

OTHER PUBLICATIONS

JPO; Application No. 2022-195323; Notice of Reasons for Refusal dated Aug. 27, 2024.

* cited by examiner

*Primary Examiner* — Muhammad Ijaz
(74) *Attorney, Agent, or Firm* — Fitch, Even, Tabin & Flannery LLP (57) ABSTRACT

A support apparatus includes a first supporter and the first supporter has multiple first side plates which are disposed to face each other, and a coupler disposed between the multiple first side plates in a position spaced apart from an installation surface to couple the multiple first side plates together, and the coupler is configured to support a side surface of electronic equipment according to an installation angle of the electronic equipment to the installation surface, with the multiple first side plates facing each other in a thickness direction of the electronic equipment.

13 Claims, 11 Drawing Sheets

SUPPORT APPARATUS

CROSS-REFERENCE TO RELATED APPLICATION

This patent application is based upon and claims the benefit of priority under 35 USC 119 of Japanese Patent Application No. 2022-195323 filed on Dec. 7, 2022, the entire disclosure of which, including the specification, claims, drawings, and abstract, is incorporated herein by reference in its entirety.

BACKGROUND

Technical Field

The present disclosure relates to a support apparatus.

Description of the Related Art

There has conventionally been known a support apparatus for supporting electronic equipment in a vertically placed state. For example, Japanese Unexamined Patent Application Publication No. 2001-358469 (JP-A-2001-358469) discloses a system for supporting electronic equipment in a vertically standing state. In this system, vertical grooves are formed from a bottom surface to side surfaces of a casing of the electronic equipment, and projections are formed on holding walls of a pedestal, and by fitting together the vertical grooves and the projections, the electronic equipment is kept standing vertically on the pedestal.

SUMMARY

According to an aspect of the present disclosure, there is provided a support apparatus including a first supporter, wherein the first supporter has multiple first side plates which are disposed to face each other, and a coupler disposed between the multiple first side plates in a position spaced apart from an installation surface to couple the multiple first side plates together, wherein the coupler is configured to support a side surface of electronic equipment according to an installation angle of the electronic equipment to the installation surface, with the multiple first side plates facing each other in a thickness direction of the electronic equipment.

DESCRIPTION OF THE EMBODIMENT

First Embodiment

Figure 1:
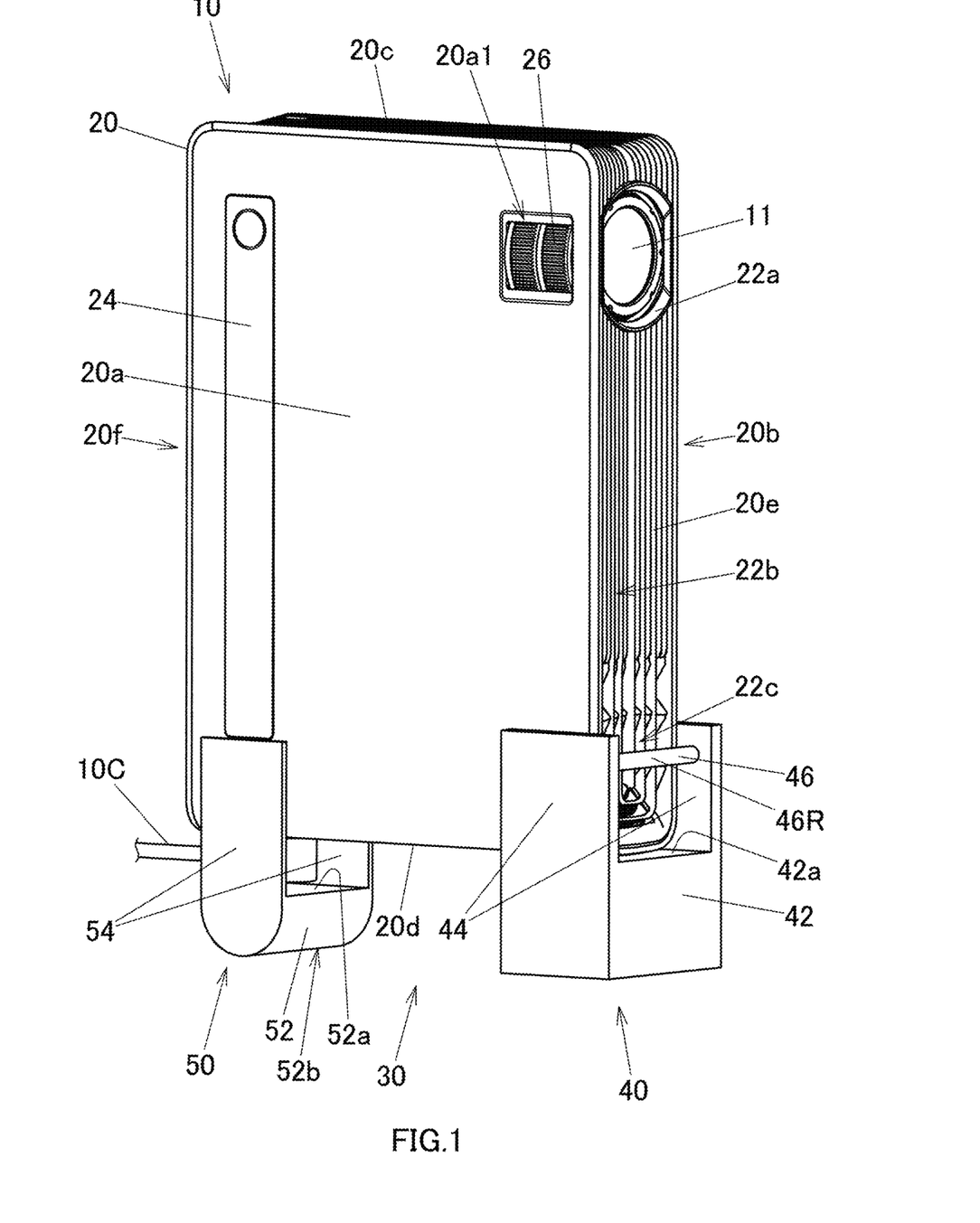
FIG. 1 is a perspective view of a support apparatus according to a first embodiment of the present disclosure as viewed from a left side thereof, showing a state in which the support apparatus supports a projector.
Figure 2:
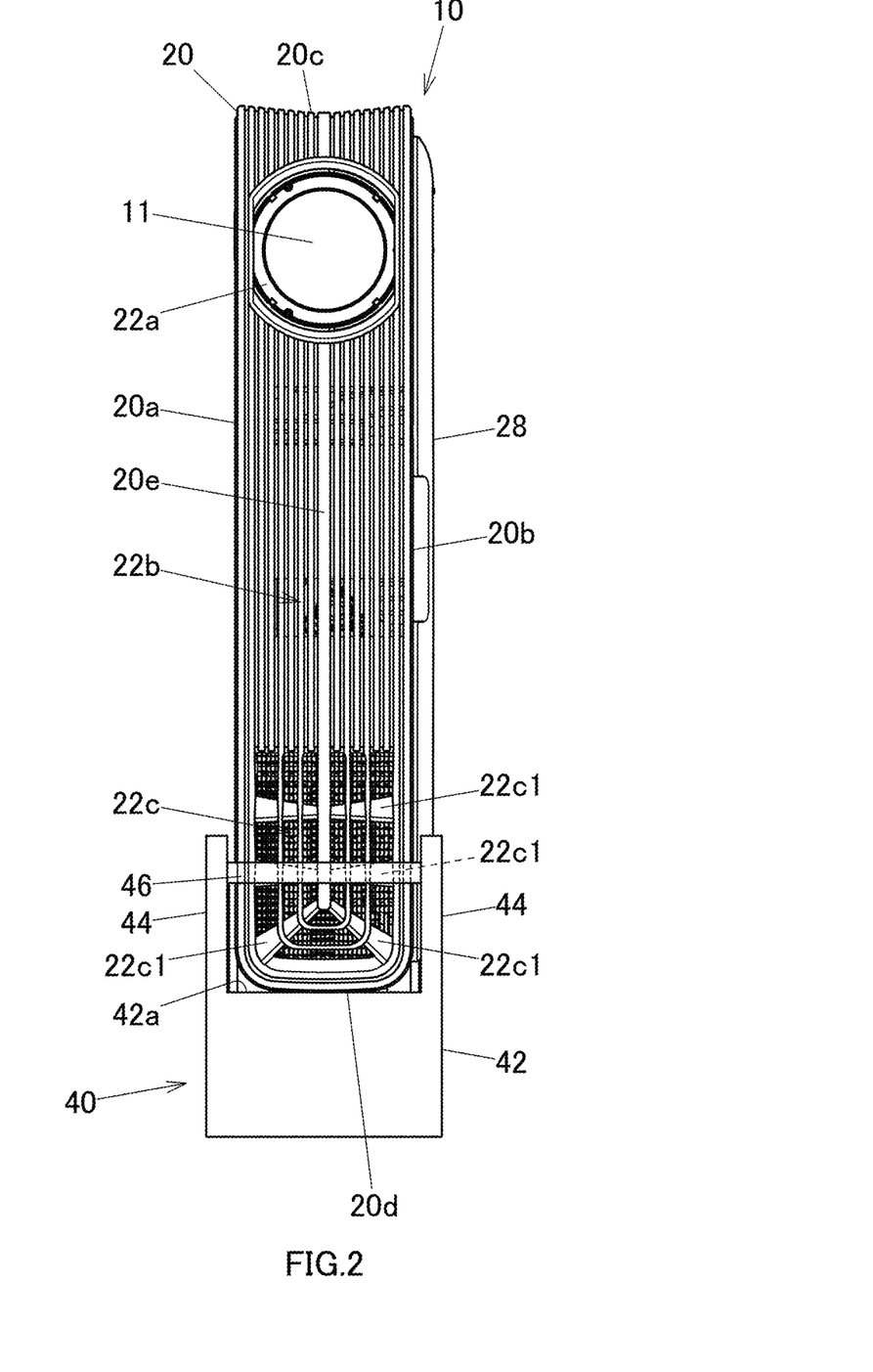
FIG. 2 is a front view of the support apparatus according to the first embodiment, showing a state in which the support apparatus supports the projector.
Figure 3:
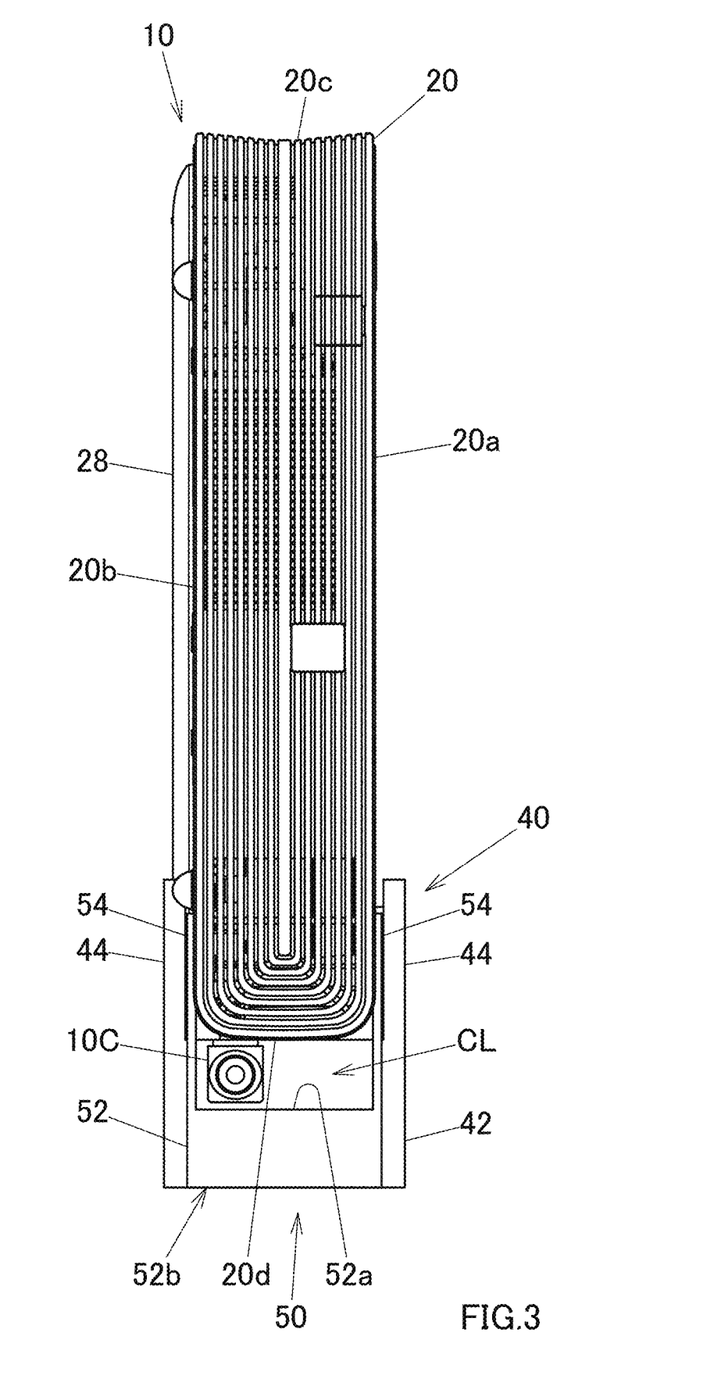
FIG. 3 is a rear view of the support apparatus according to the first embodiment, showing a state in which the support apparatus supports the projector.

Hereinafter, a first embodiment of the present disclosure will be described by reference to FIGS. 1 to 4C. As shown in FIGS. 1 to 3, a support apparatus 30 according to the first embodiment constitutes a support apparatus 30 for supporting a projector (electronic equipment) 10 in a vertically placed state. The support apparatus 30 includes a front supporter (a first supporter) 40 and a rear supporter (a second supporter) 50. With this support apparatus 30, an installation angle (a projection angle) of the projector 10 can be adjusted in such a state that the support apparatus 300 supports the projector 10. The projector 10 includes a substantially elongated rectangular parallelepiped box-shaped casing 20, and this casing 20 has six sides or surfaces (an upper surface 20a, a lower surface 20b, a left surface 20c, a right surface 20d, a front surface (a light emitting surface) 20e, and a rear surface 20f). The projector 10 has a projection port 11 from which projected light is emitted in the front surface 20e.

In the following description, when directions and/or sides of the projector 10 are referred to, they denote directions and/or sides of the projector 10 with the projector 10 placed flat. For example, when left and/or right and front and/or rear are referred to in relation to the projector 10, they denote, respectively, a left-right direction with respect to a direction in which projected light is emitted from the projection port 11 and a front-rear direction with respect to a traveling direction of projected light of the projector 10. In addition, a side of the projector 10 where the upper surface 20a resides is referred to as an upper side of the projector 10, while a side of the projector 10 where the lower surface 20b resides is referred to as a lower side of the projector 10. Further, a thickness direction of the projector 10 denotes an up-down direction of the projector 10. In the projector 10, a projection port opening 22a where the projection port 11 is exposed, a front outside air inlet port 22b, and an inside air outlet port 22c are provided in the front surface 20e of the casing 20. Multiple reinforcement ribs 22c1 are provided in an open surface of the inside air outlet port 22c, and these reinforcement ribs 22c1 each extend like a beam to reinforce the inside air outlet port 22c (refer to FIGS. 2, 10A, and 10B).

Here, a state in which the projector 10 is placed flat denotes an installation state for projecting a laterally elongated projected image with the lower surface 20b oriented towards an installation surface IS (refer to FIGS. 4A, 4B, and 4C), while a state in which the projector 10 is placed to stand vertically denotes an installation state for projecting a vertically elongated projected image with the right surface 20d oriented towards the installation surface IS. Additionally, a state in which the projector 10 is placed to lie laterally denotes an installation state for projecting a laterally elongated projected image on to a ceiling or the like with the rear surface 20f oriented towards the installation surface IS. In the following description, there may be a case in which a left-right direction with respect to the emitting direction of projected light of each of the installation states is used to denote a left side and/or a right side of the projector 10.

An operation panel 24 for use in setting the projector 10 or the like and an adjustment opening 20a1 are provided on and in the upper surface 20a of the casing 20. A part of an adjustment ring 26 for adjusting a lens barrel (not shown) provided in an interior of the casing 20 is exposed from the adjustment opening 20a1. A tilt mechanism 28 (refer to FIGS. 2 and 3) is provided at a front portion of the lower surface 20b of the casing 20 to adjust an installation angle of the casing 20 with the projector 10 being placed flat. A left outside air inlet port (not shown) and a connection port (not shown) for an image input/output connector are provided in the left surface 20c of the casing 20, while a power supply cord connection port (not shown) for supplying electric power to the projector 10 is provided in the right surface 20d of the casing 20. An AC cord 10C is connected to the power supply cord connection port.

Subsequently, the support apparatus will be described in detail. In the case that the projector 10 is supported to be placed vertically using the support apparatus 30, a front supporter 40 is configured as a unit for supporting the right surface 20d of the projector 10 in different positions according to the installation angles of the projector 10, while a rear supporter 50 is configured as a unit for supporting the projector 10 together with the front supporter 40 by holding the right surface 20d of the projector 10 at a predetermined height. In the following description, when directions and/or sides of the support apparatus 30 are referred to, they denote directions and/or sides of the support apparatus 30 in such a state that the support apparatus 30 supports the projector 10 which is then placed vertically. For example, the thickness direction of the projector 10 (the up-down direction of the projector 10) is referred to as a left-right direction of the support apparatus 30 (an upper surface side of the projector 10 is referred to as a left side of the support apparatus 30), and a direction in which the front supporter 40 and the rear supporter 50 are aligned is referred to as a front-rear direction of the support apparatus 30 (a side where the front supporter 40 resides is referred to as a front side of the support apparatus 30). Additionally, the left-right direction of the projector 10 is referred to as an up-down direction of the support apparatus 30 (the side of the projector 10 where the left surface 20c resides is referred to as an upper side of the support apparatus 30).

As shown in FIG. 2, the front supporter 40 has substantially a U-shape as viewed from a front side thereof. In the front supporter 40, a front bottom member (a first bottom member) 42 is placed on the installation surface IS, and a pair of front side plates (multiple first side plates) 44 rise into a plate shape from left and right end portions of the front bottom member 42. Then, the front bottom member 42 and the pair of front side plates 44 are integrated into the front supporter 40. An upper surface 42a of the front bottom member 42 constitutes a flat surface which is parallel to the installation surface IS. The front side plates 44 have the same dimensions and the same shape and stand from the front bottom member 42 perpendicularly to the installation surface IS. In addition, upper ends of the front side plates 44 are made parallel to the upper surface 42a of the front bottom member 42. The pair of front side plates 44 face each other with a space which is slightly larger than a dimension in the thickness direction of the projector 10 defined therebetween.

A coupler 46 is provided between the pair of front side plates 44 to couple both the front side plates 44 together. In addition, bearings, not shown, are provided individually in inner surfaces of the pair of front side plates 44 in such a manner as to face each other. The coupler 46 is made up of a cylindrical shaft member, and both end portions of the coupler 46 are pivotally supported by the corresponding bearings, whereby the coupler 46 can rotate about an axis thereof. The coupler 46 is provided at a portion of the front supporter 40 which lies closer to a front end of the front supporter 40 in a position which is spaced apart from the upper surface 42a of the front bottom member 42. Additionally, a rubber member 46R is provided on an outer circumferential surface of the coupler 46 (refer to FIG. 1).

As shown in FIG. 3, the rear supporter 50 has substantially a U-shape as viewed from a rear side thereof. In the rear supporter 50, a rear bottom member 52 is placed on the installation surface IS, and a pair of rear side plates (multiple second side plates) 54 rise into a plate shape from left and right end portions of the rear bottom member 52 in such a manner that they face each other. The rear bottom member 52 and the pair of rear side plates 54 are integrated into the rear supporter 50. An upper surface 52a of the rear bottom member 52 constitutes a flat surface which is parallel to the installation surface IS, while a lower surface (an end surface) 52b thereof is formed into a convex arc shape which protrudes towards the installation surface IS. As a result, the rear bottom member 52 is made to tilt freely along the lower surface 52b which is formed into the convex arc shape in such a state that the rear bottom member 52 is placed on the installation surface IS. The rear side plates 44 have the same dimensions and the same shape and stand from the rear bottom member 52 perpendicularly to the installation surface IS. In addition, upper surfaces of the rear side plates 54 are made parallel to the upper surface 52a of the rear bottom member 52. The pair of rear side plates 54 face each other with a space which is substantially equal to the dimension in the thickness direction of the projector 10 defined therebetween.

A clamp mechanism, not shown, is provided in an interior of the rear bottom member 52 to adjust the space between the pair of rear side plates 54. With the rear supporter 50, the projector 10 can be held while being held in the thickness direction of the projector 10 using this clamp mechanism.

Subsequently, one example of a supporting mode of the projector 10 using the support apparatus 30 according to the first embodiment will be described. As shown in FIG. 1, in the case that the projector 10 is supported to be placed vertically by use of the support apparatus 30, the projector 10 is placed vertically with the upper surface 20a thereof oriented to the left side, and a front portion of the right surface 20d of the projector 10 is supported by the front supporter 40, while a rear portion of the projector 10 which lies closer to the right surface 20d is supported by the rear supporter 50. With the support apparatus 30, an installation angle of the projector 10 which is supported vertically is changed by changing a support position of the projector 10 by the front supporter 40 while fixing a support position of the projector 10 by the rear supporter 50. Here, a switch may be provided on the casing 20 of the projector 10 to switch over a projection screen projected from the projection port 11 to a vertically oriented screen as a result of the relevant portion of the projector 10 being supported by the rear supporter 50.

Firstly, a case will be described in which the projector 10 is supported to be placed vertically with no installation angle set on the projector 10, that is, with an installation angle set at 0 degree. In this case, the projector 10 is placed vertically in such a manner that the projection port opening 22a, which is opened to the front side, is positioned upwards, and in the front supporter 40, the front portion of the right surface 20d of the projector 10 rests on the upper surface 42a of the front bottom member 42. As a result, the front portion of the projector 10 is supported. On the other hand, in the rear supporter 50, the portion of the projector 10 which lies closer to the right surface 20d is disposed between the pair of rear side plates 54, and the projector 10 is held in the thickness direction thereof by the clamp mechanism. As this occurs, the projector 10 is so held in such a position that the right surface 20d of the projector 10 which is supported by the front supporter 40 and the rear supporter 50 becomes parallel to the installation surface IS. As a result, the rear portion of the projector 10 is fixed, and the right surface 20d of the projector 10 is held at the predetermined height, whereby the projector 10 is supported accordingly.

Figure 4A:
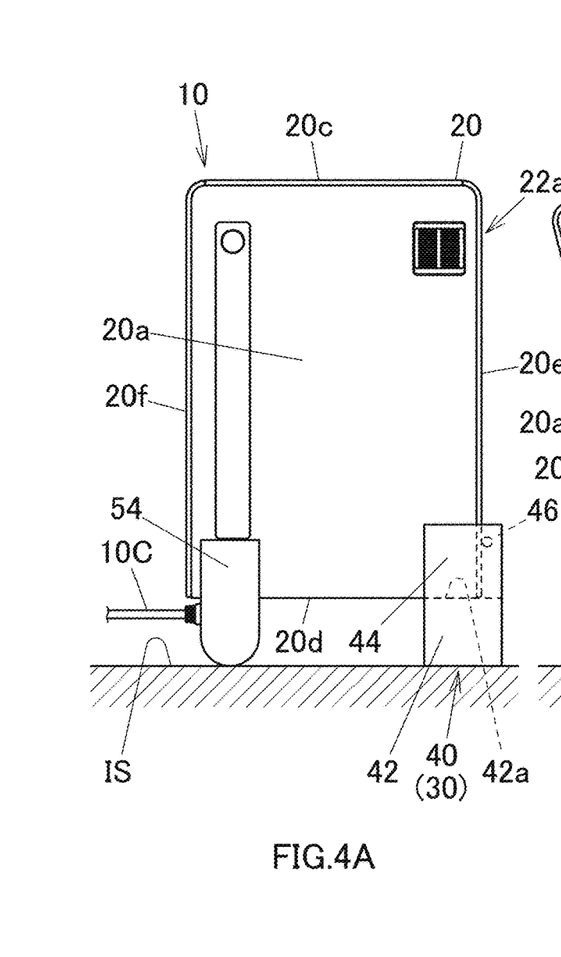
FIG. 4A is a left side view of the support apparatus according to the first embodiment, showing a state in which the support apparatus supports the projector, that is, a left side view showing the support apparatus supporting the projector in a horizontal state.

As a result of the projector 10 being supported in the way described above, the projector 10 is put in a state, as shown in FIG. 4A, in which the installation angle of the projector 10 is 0 degree, and the casing 20 of the projector 10 becomes horizontal to the installation surface IS (hereinafter, referred to as a "horizontal state"). In the horizontal state, the emitting direction of projected light from the projection port 11 is made parallel to the installation surface IS, and the coupler 46 faces the front surface 20e of the projector 10. As shown in FIG. 2, in the horizontal state, front portions of the upper surface 20a and the lower surface 20b of the projector 10 which lie close to the right surface 20d are positioned in close proximity to or brought into abutment with the pair of front side plates 44. As a result, the front portions of the projector 10 which lie close to the right surface 20d are restrained from falling in the left-right direction even though the projector 10 is vibrated accordingly.

Further, in the horizontal state, one of the reinforcement ribs 22c1 which are provided in the inside air outlet port 22c of the projector 10 comes to match the coupler 46 in position when seen from a front side of the front supporter 40. In other words, the coupler 46 is provided in a position corresponding of the reinforcement ribs 22c1 in such a state that the installation angle of the projector 10 is set at 0 degree. As a result, a flow of inside air from the inside air outlet port 22c is restrained from being interrupted by the coupler 46. As shown in FIG. 3, in the horizontal state, a clearance CL is provided between the upper surface 52a of the rear bottom member 52 and rear portions the right surface 20d of the projector 10, whereby the AC cord 10C connected to the projector 10 can be laid out in this clearance CL. As a result, the AC cord 10 is restrained from interfering with the rear supporter 50, whereby a rear portion of the projector 10 can be fixed by the rear supporter 50 in an ensured fashion.

Figures 4B, 4C:
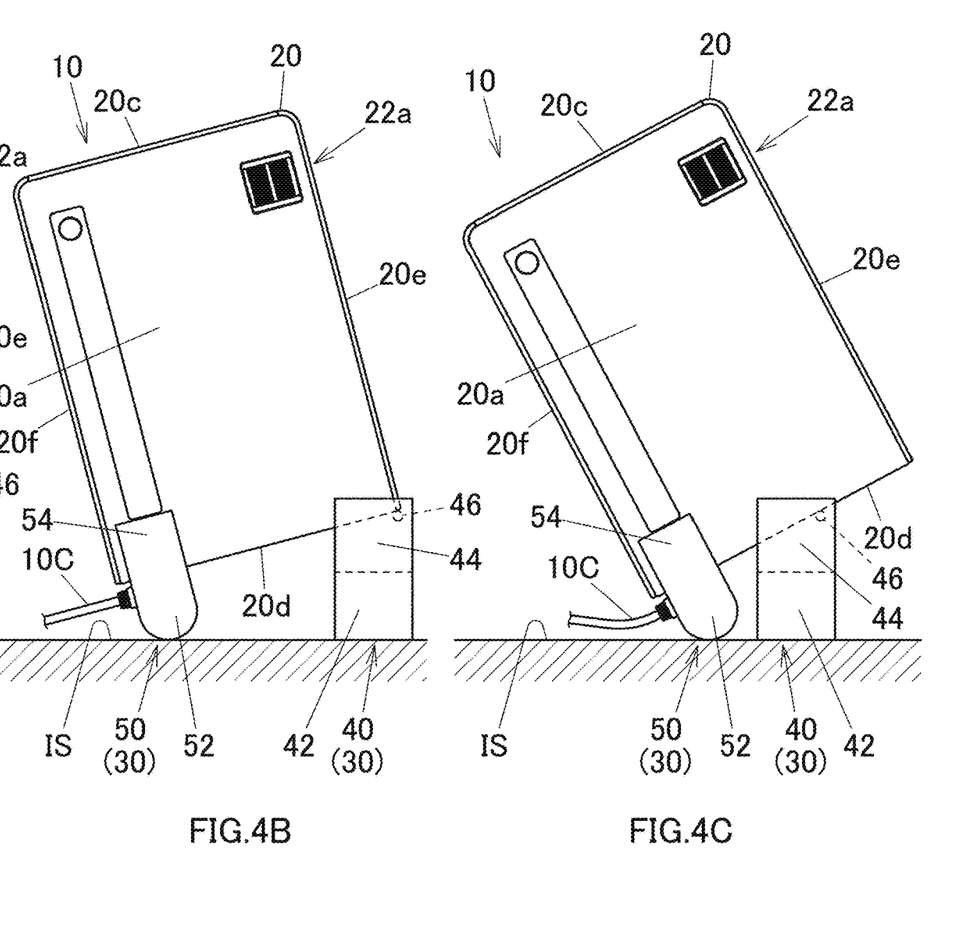
FIG. 4B is a left side view of the support apparatus according to the first embodiment, showing a state in which the support apparatus supports the projector, that is, a left side view showing the support apparatus supporting the projector in such a state that the projector is tilted rearwards slightly.
FIG. 4C is a left side view of the support apparatus according to the first embodiment, showing a state in which the support apparatus supports the projector, that is, a left side view showing the support apparatus supporting the projector in such a state that the projector is tilted rearwards significantly.

Subsequently, a case will be described in which the projector 10 is supported to be placed vertically in such a state that an installation angle is set on the projector 10, that is, in such a state that the projector 10 is tilted rearwards to the installation surface IS. In this case, as shown in FIG. 4B, in the front supporter 40, the front portion of the right surface 20d of the projector 10 rests on the coupler 46. The rear supporter 50 is tilted to the rear along the convex arc-shaped lower surface of the rear bottom member 52 while fixing the projector 10. As a result, an installation angle is set on the projector 10 accordingly, resulting in a state in which the emitting direction of projected light from the projection port 11 is inclined upwards to the installation surface IS (hereinafter, the state shown in FIG. 4B is referred to as a "first tilt state").

In the case that the installation angle of the projector 10 is increased further from the first tilt state, that is, in the case that the projector 10 is tilted further to the installation surface IS, as shown in FIG. 4C, the front supporter 40 is moved to the rear to such an extent that the front stopper 40 comes in close proximity to or into abutment with the rear supporter 50. This results in a state in which the projector 10 is tilted further than in the first tilt state (hereinafter, the state shown in FIG. 4C is referred to as a "second tilt state"). When the front supporter 40 is moved to the rear, the front supporter 40 can smoothly be moved accordingly while supporting the projector 10 by allowing the coupler 46 on which the projector 10 rests to rotate about its axis. Further, since a large friction force acts between the casing 20 of the projector 10 and the coupler 46 as a result of the rubber member 46R being provided on the outer circumferential surface of the coupler 46, the projector 10 which is supported on the coupler 46 is made to hardly deviate from its resting position on the coupler 46.

In the first tilt state and the second tilt state, respective upper portions of the front side plates 44 come to face the projector 10 while the respective upper portions are partially in close proximity to or in abutment with the projector 10. As a result, even in the event that the projector 10 is tilted to the left or right when the front supporter 40 is moved to the rear, the projector 10 is configured to be prevented or restrained from so tilting by the portions of the front side plates 44 which come in close proximity to or into abutment with the projector 10.

As has been described heretofore, with the support apparatus 30 of the first embodiment, the projector 10 can be tilted to a predetermined installation angle in such a state that the casing 20 of the projector 10 is placed vertically by moving the front supporter 40 while the front supporter 44 is supporting the front portion of the projector 10 with the rear portion of the projector 10 fixed by the rear supporter 50. In other words, the installation angle of the projector 10 can be changed in accordance with a distance between the front supporter 40 and the rear supporter 50 by changing the distance. Here, in the case that the installation angle of the projector 10 is changed from the installation angle in the first tilt state to the installation angle in the second tilt state, the installation angle of the projector 10 can also be increased further by moving the rear supporter 50 to the front together with the projector 10 without moving the front supporter 40 to the rear in such a state that the front portion of the projector 10 rests on the coupler 46.

Figure 5:
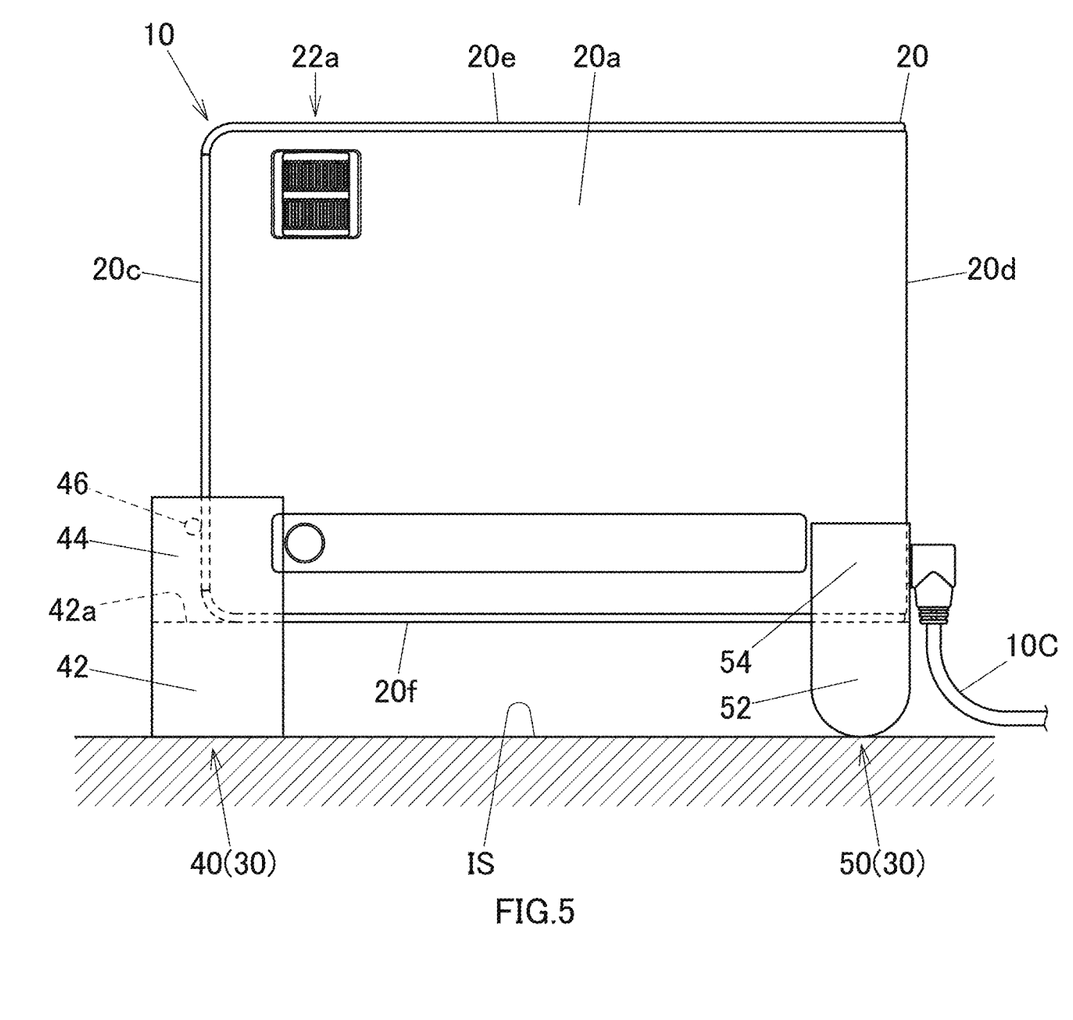
FIG. 5 is a left side view of the support apparatus according to the first embodiment, showing a state in which the projector is placed to lie laterally.

Here, with the support apparatus 30 according to the first embodiment, the projector 10 can not only be supported to be placed vertically but also be supported to be placed to lie laterally. In the latter case, as shown in FIG. 5, for example, the projector 10 is put in a laterally placed state in which the front surface 20e of the projector 10 is oriented upwards (a state in which the projection port opening 22a is opened upwards), and a right portion of the rear surface 20f of the projector 10 is supported by the front supporter 40, while a left portion of the projector 10 which lies closer to the rear surface 20f of the projector 10 is supported by the rear supporter 50. Specifically speaking, in the front supporter 40, the right portion of the rear surface 20f of the projector 10 rests on the upper surface 42a of the front bottom member 42, while in the rear supporter 50, the left portion of the projector 10 which lies closer to the rear surface 20f is disposed between the pair of rear side plates 54, so that the projector 10 is held by the clamp mechanism. In this way, the projector 10 can be supported by the support apparatus 30 in such a state that the projector 10 is placed to lie laterally.

Figure 6:
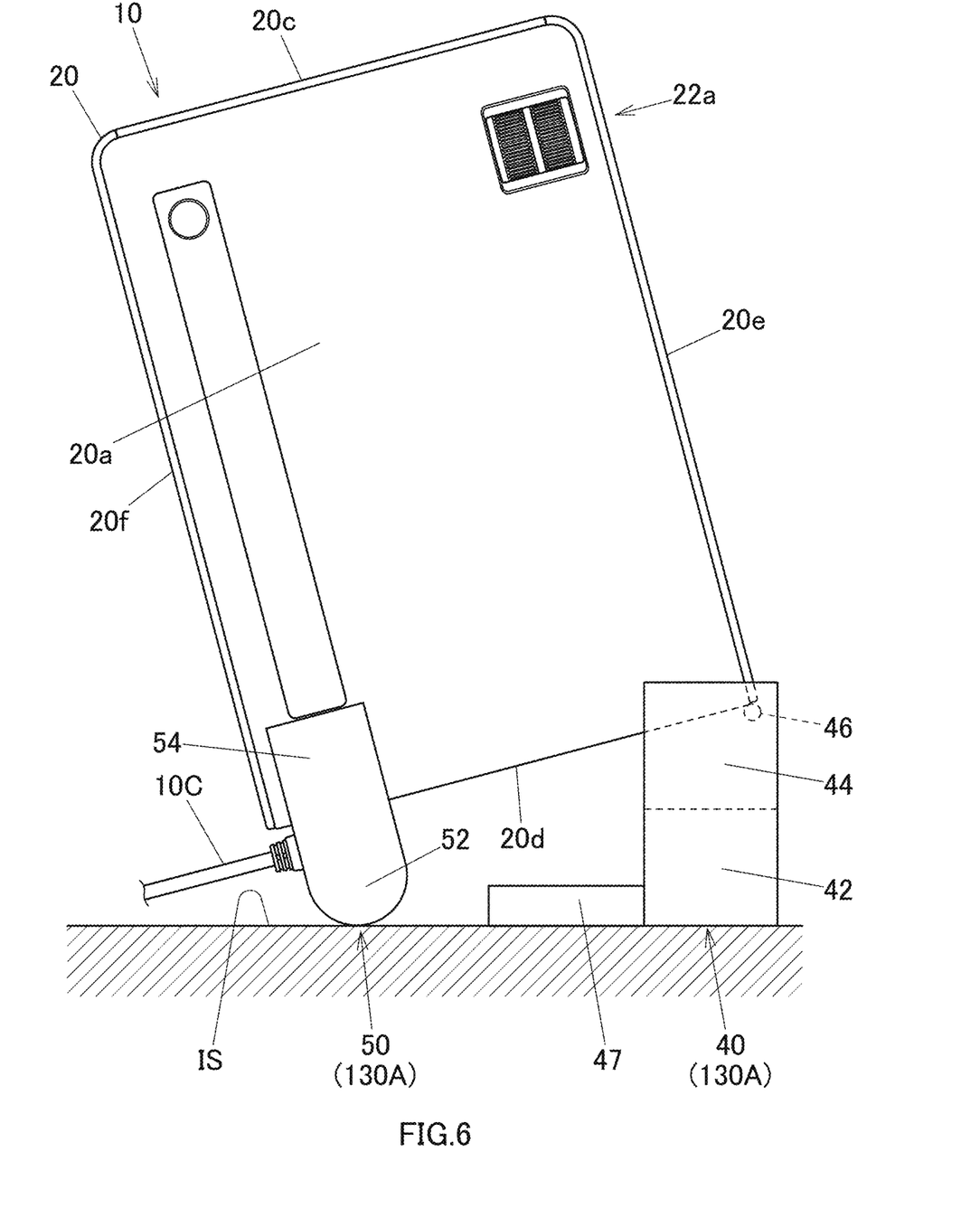
FIG. 6 is a left side view of a support apparatus according to a first modified example of the first embodiment, showing a state in which the support apparatus supports the projector.

Subsequently, a first modified example of the first embodiment will be described. As shown in FIG. 6, a support apparatus 130A according to the first modified example is configured to include further a stopper 47 which is provided at a portion of the support apparatus 30 illustrated in FIGS. 1 to 5. The stopper 47 constitutes a plate-like member and is attached to a rear side of a front stopper 40 while being placed on the installation surface IS.

With the stopper apparatus 130A according to the first modified example, when the front supporter 40 is caused to move towards a rear supporter 50 a predetermined distance or larger, a rear end of the stopper 47 comes to interfere with the rear supporter 50, whereby the front supporter 40 is restricted from moving towards the rear supporter 50 any further. As a result, the projector 10 can be prevented from falling down to the rear together with the support apparatus 130A as a result of the projector 10 tilting to the rear excessively due to an excessive reduction in the distance between the front supporter 40 and the rear supporter 50. A dimension of the stopper 47 in the front-rear direction can be adjusted in accordance with a desired minimum distance between the front supporter 40 and the rear supporter 50, in other words, a maximum installation angle of the projector 10.

Figure 7:
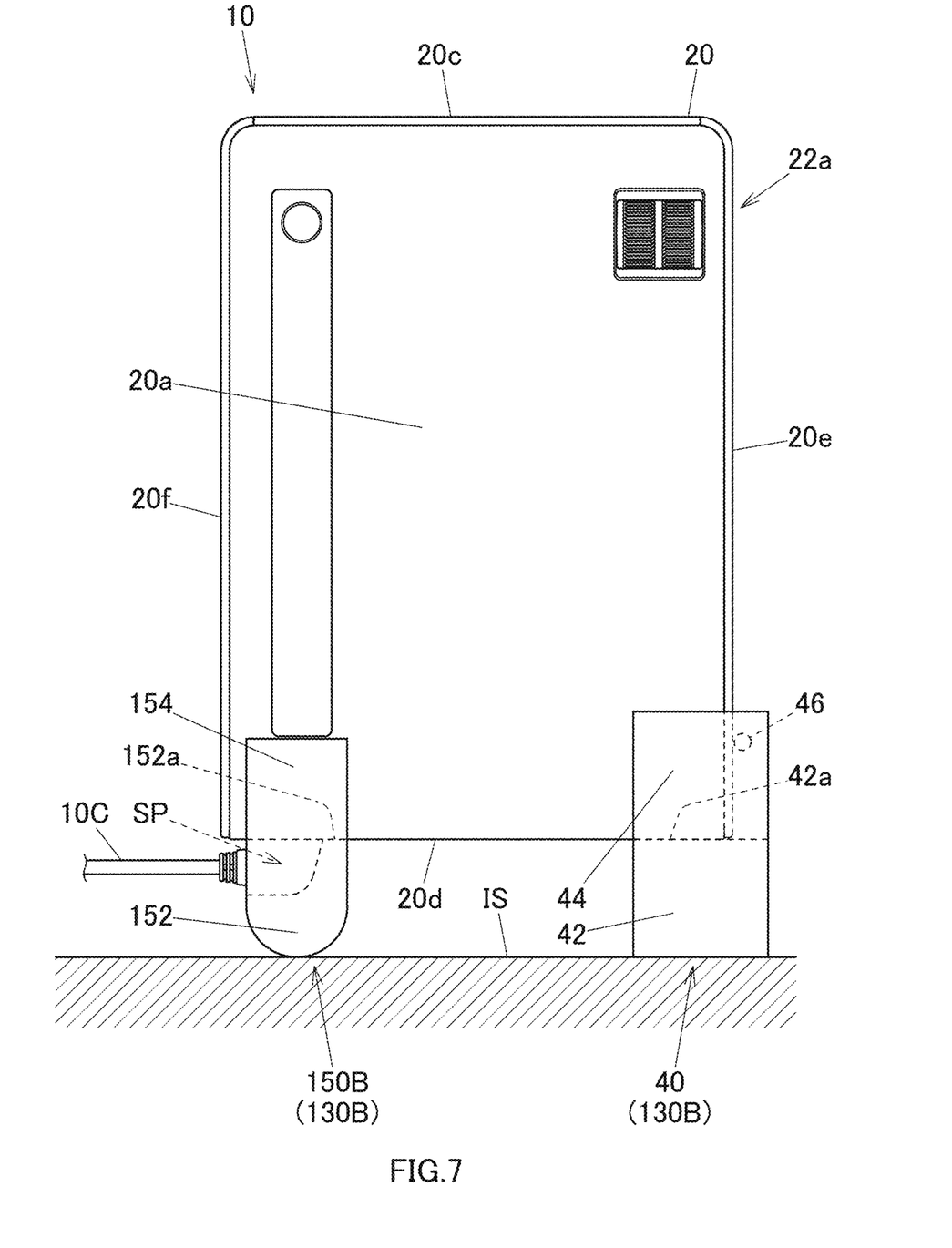
FIG. 7 is a left side view of a support apparatus according to a second modified example of the first embodiment, showing a state in which the support apparatus supports the projector.

Subsequently, a second modified example of the first embodiment will be described. As shown in FIG. 7, in a support apparatus 130B according to the second modified example, a height of an upper surface 152a of a rear bottom member 152 from the installation surface IS with a rear supporter 150B remaining not tilted or horizontal is made to be substantially equal to a height of an upper surface 42a of a front bottom member 42 from the installation surface IS. As a result, the projector 10 can be supported in the horizontal state by resting the rear portion of the right surface 20d of the projector 10 on the upper surface 152a of the rear bottom member 152 in such a state that the front portion of the right surface 20d of the projector 10 rests on the upper surface 42a of the front bottom member 42.

Here, in the rear bottom member 152 of the second modified example, a groove-shaped accommodation space SP is provided substantially at a central portion in the left-right direction of the upper surface 152a of the rear bottom member 152 in such a manner as to extend therefrom towards a rear surface of the rear bottom member 152 for passage of the AC cord 10C and a plug of the AC cord 10C. As a result, the rear portion of the right surface 20d of the projector 10 can be rested on the upper surface 152a of the rear bottom member 152 without the AC cord 10C interfering with the upper surface 152a of the rear bottom member 152.

Incidentally, there is a case in which a user wants to support electronic equipment such as a projector or the like to be placed vertically. However, vertical grooves like those disclosed in JP-A-2001-358469 are not necessarily provided on side surfaces of a projector. With no such groove provided, a projector cannot be supported to be placed vertically with the system disclosed in JP-A-2001-358469. In addition, there is a case in which the user wants to support a projector to be placed vertically while tilting the projector in order to change a projection angle thereof. However, for example, when attempting to provide a configuration in which a projector is supported to rotate freely, a resulting support apparatus has to be complicated in mechanism and large in size.

On the other hand, with the support apparatus 30 according to the first embodiment, the problem mentioned above is solved, and the electronic equipment can be supported to be placed vertically at a desired installation angle. That is, the support apparatus 30 according to the first embodiment includes the front supporter 40. The front supporter 40 has the pair of front side plates 44 which are disposed to face each other, and the coupler 46 disposed between the pair of front side plates 44 to couple them together in the position spaced apart from an installation surface IS. Then, the coupler 46 supports the right surface 20d of the projector 10 according to the installation angle of the projector 10 to the installation surface IS, with the pair of front side plates 44 facing each other in the thickness direction of the projector 10. As a result, the tilt angle of the projector 10 to the installation surface IS can be set to an arbitrary angle by moving the front supporter 40 in the front-rear direction in such a state that the right surface 20d of the projector 10 is supported by the coupler 46. In this way, with the support apparatus 30, the projector 10 can be supported to be placed vertically at a desired installation angle.

With the support apparatus 30, the coupler 46 is formed into the shaft shape. As a result, the right surface 20d of the projector 10 is easily rested on the coupler 46. Additionally, with the support apparatus 30, the coupler 46 is provided in such a manner as to rotate about the axis thereof. As a result, the front supporter 40 can smoothly be moved in the front-rear direction in such a state that the right surface 20d of the projector 10 continues to be supported on the coupler 46. Further, with the support apparatus 30, the coupler 46 has the rubber member 46R which is provided on the outer circumferential surface of the coupler 46. As a result, since the friction force acting between the right surface 20d of the projector 10 and the coupler 46 is increased, the projector 10, which is supported on the coupler 46, can be made to hardly deviate from its resting position on the coupler 46.

With the support apparatus 30, the front supporter 40 has the front bottom member 42 which is installed on the installation surface IS and from which the pair of front side plates 44 rise, and the front bottom member 42 has the upper surface 42a on which the right surface 20d of the projector 10 can be rested. In consequence of this, the projector 10 can be supported stably as a result of the projector 10 being rested on the upper surface 42a of the front bottom member 42.

With the support apparatus 30, the upper surface 42a of the front bottom member 42 constitutes a horizontal surface with respect to the installation surface IS. As a result, the projector 10 can be supported horizontally with respect to the installation surface IS by resting the projector 10 on the upper surface 42a of the front bottom member 42.

In addition, with the support apparatus 30, the support apparatus 30 is configured to support the projector 10 having the front surface 20e in which the projection port 11 and the inside air outlet port 22c are provided. Then, the coupler 46 is provided in the position which faces the front surface 20e of the projector 10, with the projector 10 being rested on the upper surface 42a of the front bottom member 42. As a result, in the case that the front supporter 40 deviates rearwards in position in such a state that projector 10 rests on the upper surface 42a of the front bottom member 42, since the coupler 46 comes to interfere with the front surface 20e of the projector 10, the front supporter 40 can be prevented from so deviating excessively.

Further, with the support apparatus 30, the support apparatus 30 is configured to support the projector 10 in which the reinforcement ribs 22c1 are provided in the inside air outlet port 22c along the front surface 20e of the projector 10, and the coupler 46 is provided in the position corresponding to one of the reinforcement ribs 22cl, with the projector 10 being rests on the upper surface 42a of the front bottom member 42. As a result, since inside air which is let out from the inside air outlet port 22c is restrained from being interrupted additionally by the coupler 46 in the vicinity of the reinforcement rib 22c1 which is positioned corresponding to the coupler 46 in the inside air outlet port 22, the projector 10 can be supported to be placed vertically by use of the support apparatus 30 without reducing the inside air letting out function of the projector 10.

The support apparatus 30 includes the rear supporter 50 for supporting the projector 10 together with the front supporter 40 by holding the right surface 20d of the projector 10 at the predetermined height. In addition, the distance between the front supporter 40 and the rear supporter 50 can be changed, whereby the installation angle is changed according to the distance between the front supporter 40 and the rear supporter 50. As a result, even in such a state that the support apparatus 30 is placed vertically, the projector 10 can be supported stably by supporting the projector 10 by both the front supporter 40 and the rear supporter 50. Further, the installation angle of the projector 10 can be changed in accordance with the distance between the front supporter 40 and the rear supporter 50 by changing the distance therebetween.

With the support apparatus 30, the rear supporter 50 has the pair of rear side plates 54 which are disposed to face each other and is configured to support the projector 10 by holding the projector 10 between the pair of side plates 54 in the thickness direction of the projector 10 according to the installation angle to the installation surface IS. As a result, the rear portion of the projector 10 can be fixed while being supported by the rear supporter 50 by holding the rear portion of the projector 10 by use of the pair of rear side plates 54 of the rear supporter 50. In this way, with the support apparatus 30, the specific configuration for supporting the rear portion of the projector 10 in an ensured fashion can be provided.

With the support apparatus 30, the rear supporter 50 has the rear bottom member 52 from which the pair of rear side plates 54 rise. As a result, the rear bottom member 52 can be installed on the installation surface IS while holding to support the projector 10 between the pair of rear side plates 54.

With the support apparatus 30, the rear supporter 50 is installed on the installation surface IS with the end surface formed into the convex arc shape which protrudes towards the installation surface IS. As a result, the projector 10 which is fixedly supported by the rear supporter 50 can easily be tilted by tilting the rear supporter 50 along the end surface which is formed into the convex arc shape.

Second Embodiment

Figure 8:
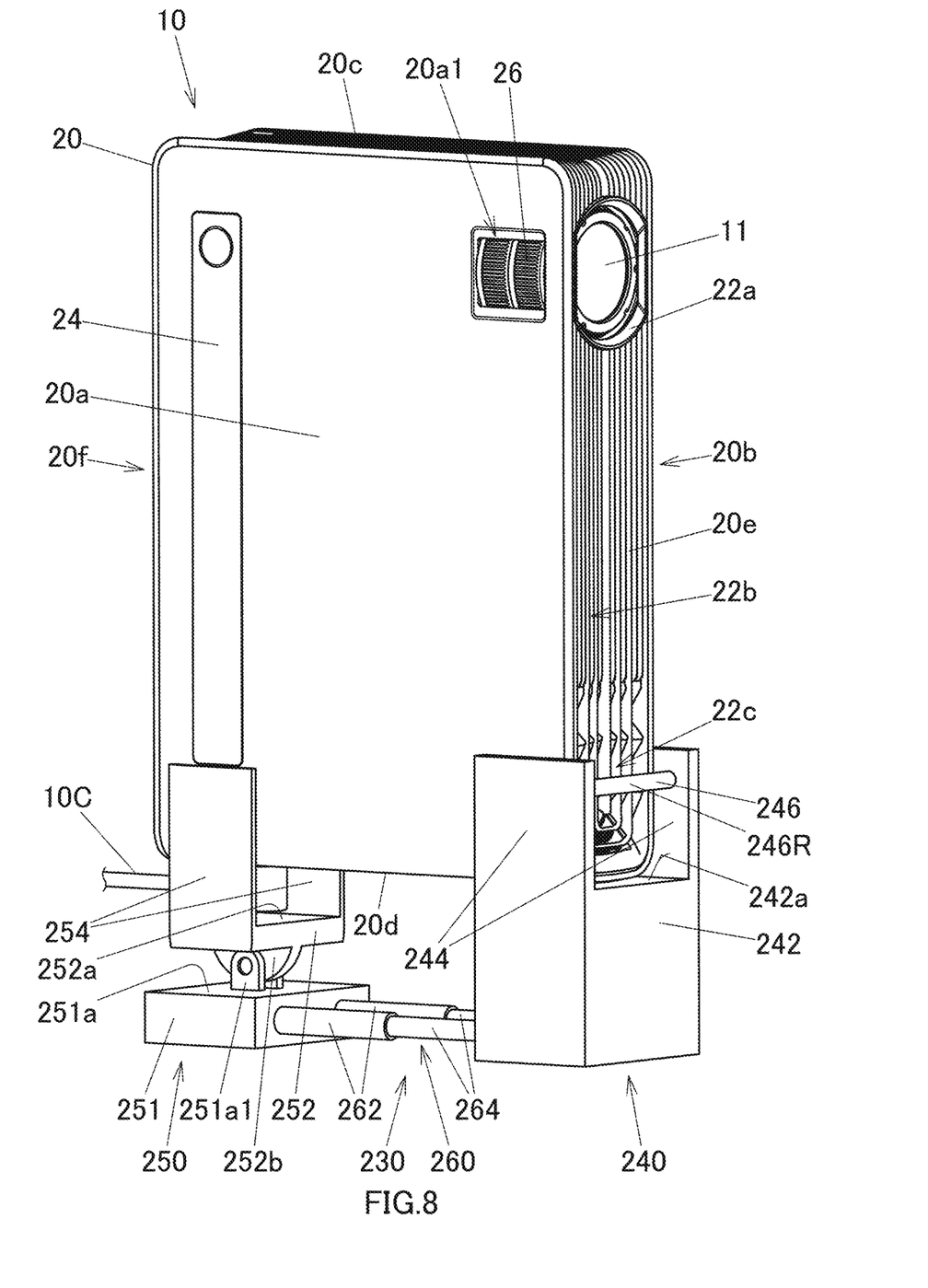
FIG. 8 is a perspective view of a support apparatus according to a second embodiment of the present disclosure as viewed from a left side thereof, showing a state in which the support apparatus supports a projector.

Subsequently, referring to FIGS. 8 to 11, a second embodiment of the present disclosure will be described. Here, in the description of the second embodiment, the description of like configurations to those of the first embodiment will be omitted or simplified. As shown in FIG. 8, as with the support apparatus 30 of the first embodiment, a support apparatus 230 according to the second embodiment includes a front supporter 240 for supporting a front portion of a projector 10 which is placed vertically and a rear supporter 250 for supporting a rear portion of the projector 10. The front supporter 240 has a front bottom member 242, a pair of front side plates 244, and a coupler 246. In the front supporter 240, a height dimension of the front bottom member 242 is set larger the height dimension of the front bottom member 42 of the first embodiment. The other configurations of the front supporter 240 remain the same as those of the front supporter 40 of the first embodiment.

The coupler 246 also has the same configuration as those of the coupler 46 of the first embodiment. The coupler 246 is made up of a cylindrical shaft which is provided in such a manner as to couple both the front side plates 244 together and is pivotally supported on both the front side plates 244 in such a manner as to rotate about an axis thereof. Then, a rubber member 246R is provided on an outer circumferential surface of the coupler 246.

Figure 9:
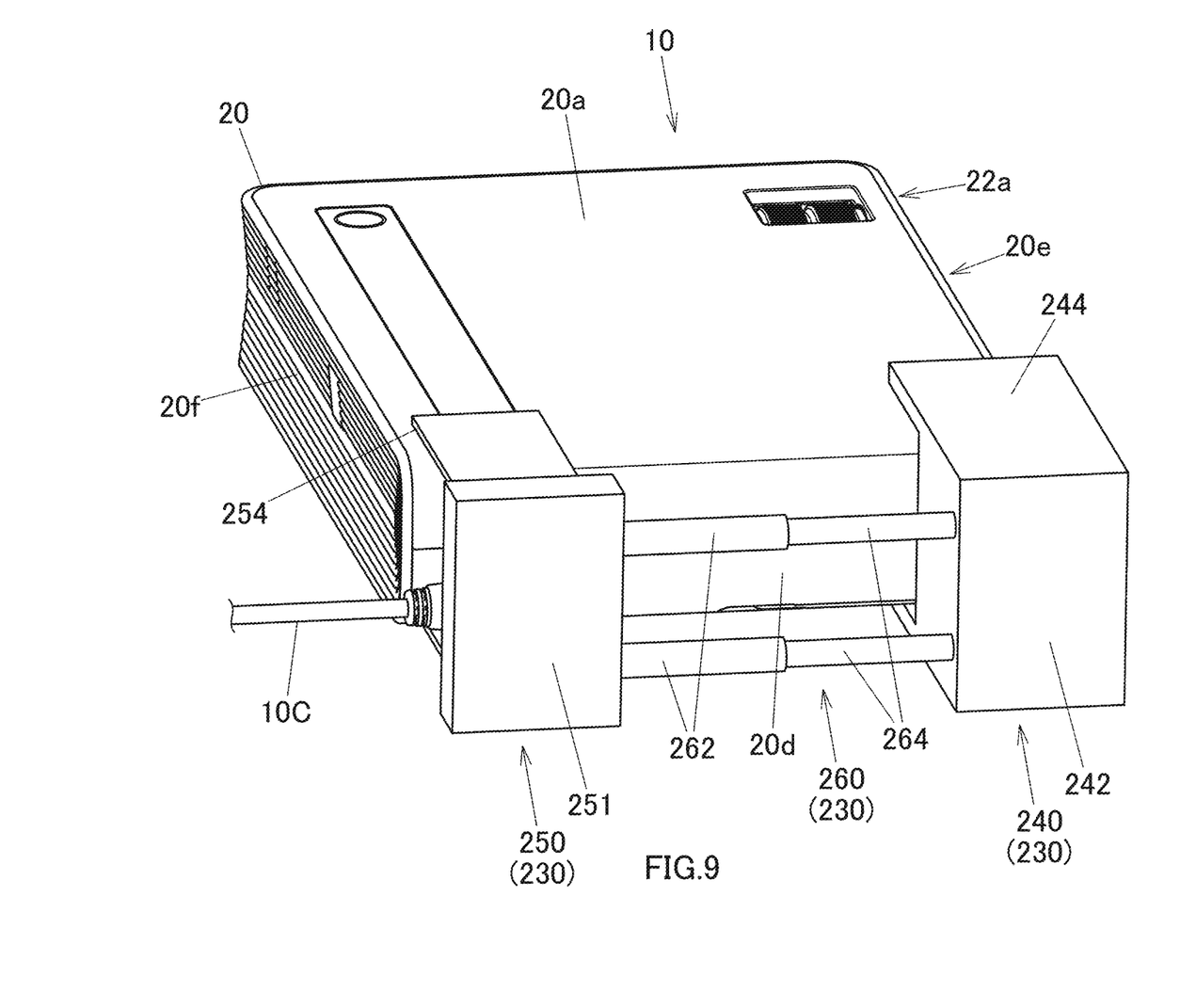
FIG. 9 is a perspective view of the support apparatus according to the second embodiment as viewed from a lower side thereof, showing a state in which the support apparatus supports the projector.

As shown in FIGS. 8 and 9, the rear supporter 250 includes an installation member 251 which is installed on an installation surface IS, a rear bottom member (a second bottom member) 252, and a pair of rear side plates (second side plates) 254 which rise from left and right end portions of the rear bottom member 252 into a plate shape and which are disposed to face each other. The rear bottom member 252 and the pair of rear side plates 254 are provided in such a manner as to be integrated into one unit. The installation member 251 has a prism shape (a thick plate shape), and an upper surface 251a thereof constitutes a flat surface which is parallel to the installation surface IS. A rotational portion support portion 251al is provided substantially at a central portion of the upper surface 251a of the installation member 251 to support the rear bottom member 252 in a rotatable manner. The rotational portion support portion 251a1 is made up of a pair of plate members which slightly rise upwards with both plate surfaces oriented in a left-right direction, and upper end portions of the pair of plate members each have a convex arc shape.

In the rear bottom member 252, the upper surface 252a constitutes the flat surface which is parallel to the installation surface IS, and a rotational portion 252b is provided in a such a manner as to extend from a central portion of a lower surface towards the installation member 251 with both plate surfaces thereof oriented in the left-right direction. A lower end portion of the rotational portion 252b has a convex arc shape, and the rotational portion 252b is held in a rotatable manner between the pair of plate members of the rotational portion support portion 251a1. The rotational portion 252b is configured to rotate about an axis extending along the left-right direction and is also configured to be fixed at an arbitrary rotation position. A clamp mechanism, not shown, is provided in an interior of the rear bottom member 252 to adjust a space defined between the pair of rear side plates 254. With the rear supporter 250, the projector 10 can be held in a thickness direction thereof for retainment by the clamp mechanism with the rotational portion 52b fixed in an arbitrary rotation position.

As shown in FIGS. 8 and 9, a connection unit 260 is provided between the front supporter 240 and the installation member 251 of the rear supporter 250 to connect them both together while being caused to extend and contract therebetween. The connection unit 260 is made up of two cylindrical shaft members which are spaced apart from each other in the left-right direction. Then, front end portions thereof are connected to the front supporter 240, while rear end portions thereof are connected to the installation member 251. A rear portion of the connection unit 260 is made up of large-diameter shaft members 262, while a front portion of the connection unit 260 is made up of small-diameter shaft members 264 which are smaller in diameter than the large-diameter shaft members 262. The connection unit 260 is configured to extend and contract as a result of the small-diameter shaft members 264 being accommodated in the corresponding large-diameter shaft members 262 and further, the large-diameter shaft members 262 in which the small-diameter shaft members 264 are accommodated being accommodated in an interior of the installation member 251. A distance defined between the front supporter 240 and the rear supporter 250 can be decreased by causing the connection unit 260 to contract.

Subsequently, one example of a support mode of the projector 10 by use of the support apparatus 230 according to the second embodiment will be described. In the case that the projector 10 is supported to be placed vertically with setting no installation angle on the projector 10, as with the first embodiment, in the front supporter 240, a front portion of a right surface 20d of the projector 10 rests on the upper surface 242a of the front bottom member 242. Then, in the rear supporter 250, a rear portion of the right surface 20d of the projector 10 is disposed between the pair of rear side plates 254, so that the projector 10 is held therebetween in the thickness direction thereof by the clamp mechanism. For this, the projector 10 is held in a position where the right surface 20d of the projector 10, which is supported by the front supporter 240 and the rear supporter 250, becomes parallel to the installation surface IS. Alternatively, a configuration may be adopted in which a height of the upper surface 252a of the rear bottom member 252 from the installation surface IS is set equal to a height of the upper surface 242a of the front bottom member 242 from the installation surface IS, and the rear portion of the right surface 20d of the projector 10 is rested on the upper surface 252a of the rear bottom member 252, after which the projector 10 is held by the clamp mechanism.

Figure 10A:
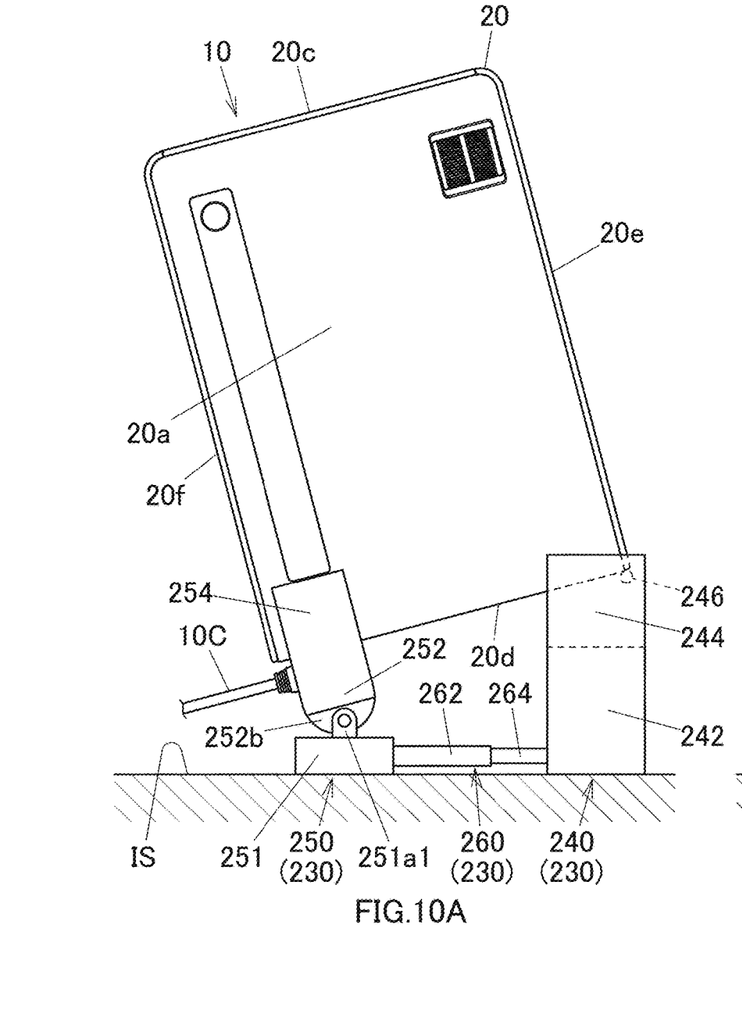
FIG. 10A is a left side view of the support apparatus according to the second embodiment, showing a state in which the support apparatus supports the projector, that is, a left side view showing the support apparatus supporting the projector in such a state that the projector is tilted rearwards slightly.
Figure 11A:
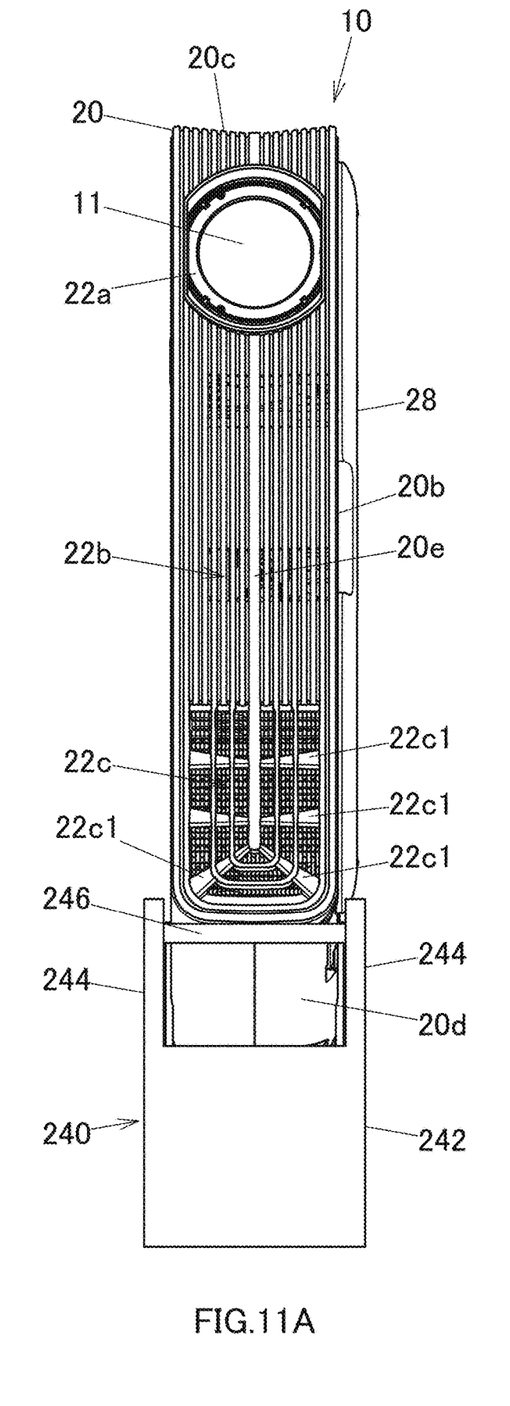
FIG. 11A is a front view of the support apparatus according to the second embodiment, showing a state in which the support apparatus supports the projector, that is, a front view showing the support apparatus supporting the projector in a horizontal state.

As shown in FIGS. 10A and 11A, in the case that the projector 10 is supported to be placed vertically in such a state that the projector 10 is tilted rearwards to the installation surface IS, in the front supporter 240, a front portion of the right surface 20d of the projector 10 is rested on the coupler 246. With respect to the rear supporter 250, the rotational portion 252b is rotated in such a state that the projector 10 is fixed, so that the rear bottom member 252 is tilted rearwards and is then fixed. As a result, an installation angle is set on the projector 10, resulting in a state in which the emitting direction of projected light from a projection port 11 is inclined upwards to the installation surface IS (hereinafter, the state shown in FIGS. 10A and 11A is referred to as a "third tilt state").

The installation angle of the projector 10 can be increased further by causing the connection unit 260 to contract further from the third tilt state so as to move the front supporter 240 towards the installation member 251 of the rear supporter 250. As with the first embodiment, when the front supporter 240 is moved rearwards, the front supporter 240 can be so moved smoothly while supporting the projector 10 as a result of the coupler 246 on which the projector 10 is rested rotating about the axis thereof. For this, the projector 10, which is moving on the coupler 246, is made to slide hardly by the rubber member 246R which is provided on the outer circumferential surface of the coupler 246.

Figure 10B:
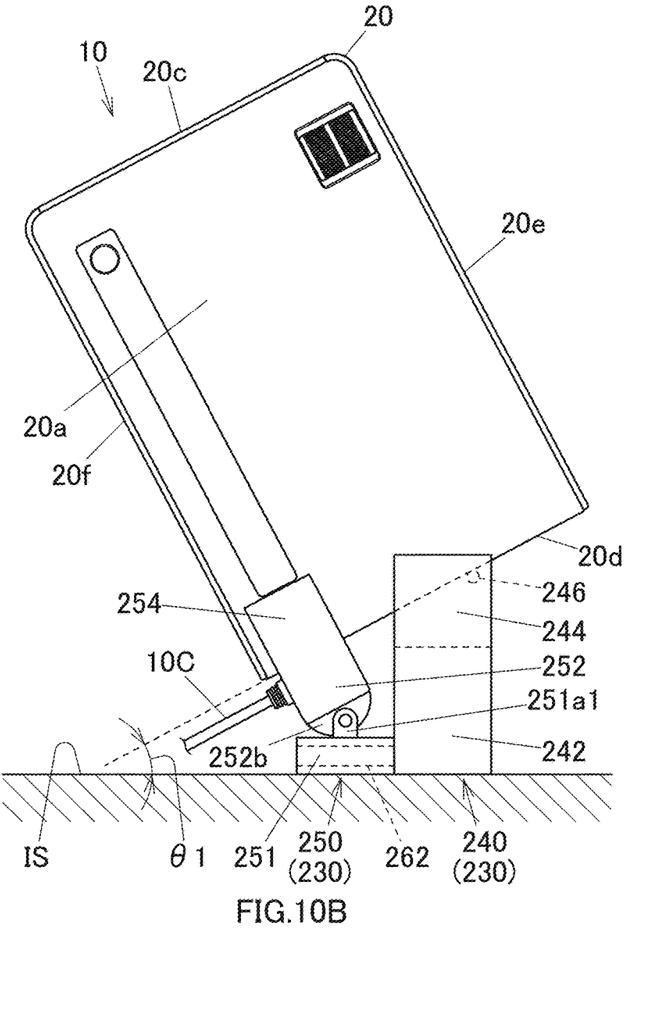
FIG. 10B is a left side view of the support apparatus according to the second embodiment, showing a state in which the support apparatus supports the projector, that is, a left side view showing the support apparatus supporting the projector in such a state that the projector is tilted rearwards significantly.
Figure 11B:
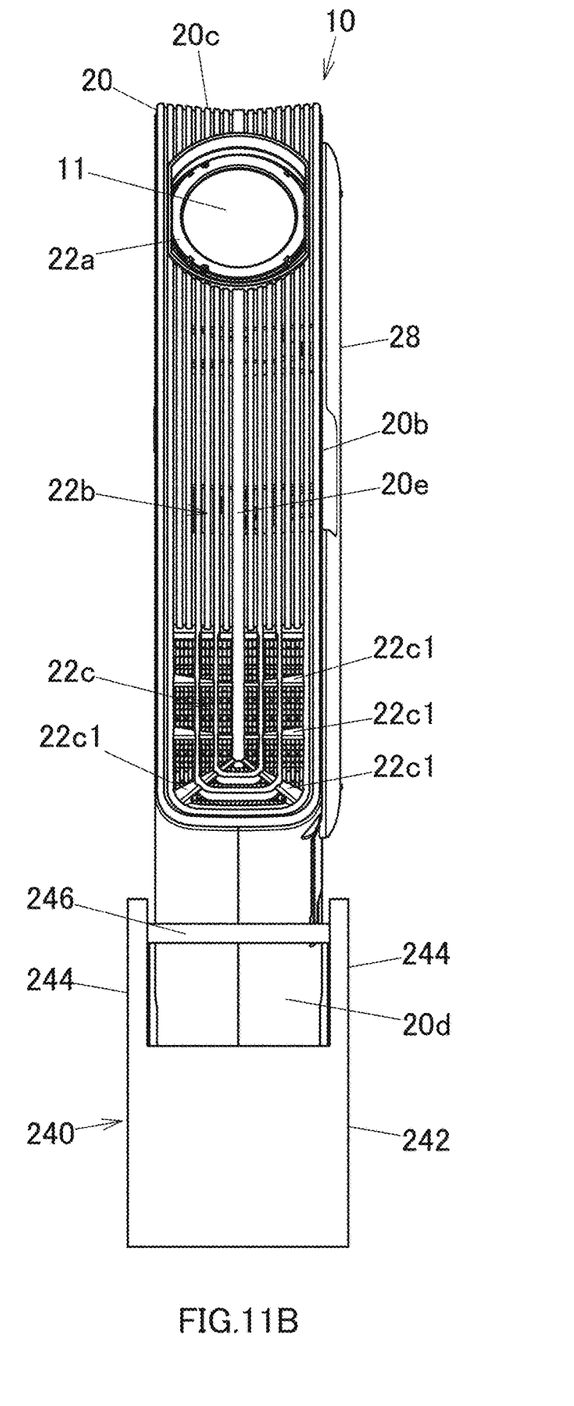
FIG. 11B is a front view of the support apparatus according to the second embodiment, showing a state in which the support apparatus supports the projector, that is, a front view showing the support apparatus supporting the projector in such a state that the projector is tilted rearwards significantly.

In the case that the projector 10 is tilted at a maximum angle to the installation surface IS, as shown in FIGS. 10B and 11B, the connection unit 260 is caused to contract so that the large-diameter portions 262 are accommodated in the interior of the installation member 251, whereby the front supporter 240 is brought into abutment with the installation member 251 (hereinafter, the state shown in FIGS. 10B and 11B are referred to as a "fourth tilt state"). In the fourth tilt state, a tilt angle θ1 of the projector 10 to the installation surface IS is set at 30 degrees or larger. In other words, the coupler 246 is provided at such a height that an angle formed by the right surface 20d of the projector 10 which is supported by the coupler 246 to the installation surface IS when the front supporter 240 is brought into abutment with the rear supporter 250 becomes 30 degrees or larger.

In addition, a configuration may be adopted in which the support apparatus 230 of the second embodiment includes a control unit which is provided in an interior of the front supporter 240 and/or the rear supporter 250, so that the connection unit 260 is made to extend and contract with electric power through a remote control. That is, a configuration may be adopted in which the distance between the front supporter 240 and the rear supporter 250, which both support the projector 10, can be adjusted remotely with electric power.

Thus, as has been described heretofore, with the support apparatus 230 according to the second embodiment, the rear supporter 250 has the installation member 251 installed on the installation surface IS and configured to support the rear bottom member 252 in a rotatable manner and includes further the connection unit 260 configured to support the front supporter 240 and the installation member 251 while being caused to extend and contract therebetween. As a result, the rear bottom member 252 can be held at a desired rotation angle by the installation member 251, thereby facilitating the hold of the projector 10 which is supported by the front supporter 240 and the rear supporter 250 in such a state that the projector 10 is tilted at a desired installation angle.

Further, when moving the front supporter 240 towards the installation member 251 (towards the rear supporter 250) in order to tilt the projector 10 at a desired installation angle, a positional deviation of the front supporter 240 is restrained by the connection unit 260 by providing the connection unit 260, thereby making it possible to move the front supporter 240, which is supporting the projector 10, stably. As a result, the projector 10, which is being supported by the front supporter 240 and the rear supporter 250, can easily be tilted to a desired installation angle.

With the support apparatus 230 according to the second embodiment, the coupler 246 is provided at such a height that the angle formed by the right surface 20d of the projector 10, which is supported by the coupler 246, to the installation surface IS becomes 30 degrees or larger. As a result, the projector 10 can be supported stably by the front supporter 240 and the rear supporter 250 while being allowed to tilt at the installation angle of 30 degrees or larger.

The embodiments that have been described heretofore are presented as the examples, and hence, there is no intention to limit the scope of the present invention by the embodiments. The novel embodiments can be carried out in other various forms, and various omissions, replacements and modifications can be made thereto without departing from the spirit and scope of the present invention. Those resulting embodiments and modified examples thereof are included in the scope and gist of the present invention and are also included in the scope of inventions claimed for patent under claims below and their equivalents. For example, in the embodiments described heretofore, while the upper surface of the front supporter is described as being the surface parallel to the installation surface, a lowered step-like portion may be provided at a front portion of the upper surface of the front supporter so that a projection unit supported on the front supporter can easily tilt to the front. In addition, for example, in the embodiments described heretofore, while the front supporter is described as having the pair of front side plates, while the rear supporter is described as having the pair of rear side plates, the front side plates and the rear side plates need only be provided at least two each, and hence, three or more front side plates and rear side plates may be provided.

What is claimed is:

1. A support apparatus comprising:
   a first supporter,
   wherein the first supporter has multiple first side plates which are disposed to face each other, and a coupler disposed between the multiple first side plates in a position spaced apart from an installation surface to couple the multiple first side plates together,
   wherein the coupler is configured to support a side surface of electronic equipment according to an installation angle of the electronic equipment to the installation surface, with the multiple first side plates facing each other in a thickness direction of the electronic equipment,
   wherein the coupler is formed into a cylindrical shape,
   wherein the coupler is provided in such a manner as to rotate about an axis thereof, and
   wherein the coupler comprises a rubber member provided on an outer circumferential surface thereof.

2. The support apparatus according to claim 1,
   wherein the first supporter has a first bottom member which is installed on the installation surface and from which the multiple first side plates rise, and
   wherein the first bottom member has an upper surface on which the side surface of the electronic equipment can be rested.

3. A support apparatus comprising:
   a first supporter,
   wherein the first supporter has multiple first side plates which are disposed to face each other, and a coupler disposed between the multiple first side plates in a position spaced apart from an installation surface to couple the multiple first side plates together,
   wherein the coupler is configured to support a side surface of electronic equipment according to an installation angle of the electronic equipment to the installation surface, with the multiple first side plates facing each other in a thickness direction of the electronic equipment,
   wherein the first supporter has a first bottom member which is installed on the installation surface and from which the multiple first side plates rise,
   wherein the first bottom member has an upper surface on which the side surface of the electronic equipment can be rested,
   wherein the support apparatus is configured to support the electronic equipment constituting a projector having a light emitting surface in which a projection port and an inside air outlet port are provided, and
   wherein the coupler is provided in a position facing the light emitting surface, with the electronic equipment being rested on the upper surface of the first bottom member.

4. The support apparatus according to claim 3,
   wherein the coupler is formed into a cylindrical shape.

5. The support apparatus according to claim 4,
   wherein the coupler is provided in such a manner as to rotate about an axis thereof.

6. The support apparatus according to claim 5,
   wherein the coupler comprises a rubber member provided on an outer circumferential surface thereof.

7. The support apparatus according to claim 3,
   wherein the upper surface of the first bottom member constitutes a horizontal surface with respect to the installation surface.

8. The support apparatus according to claim 3, configured to support the electronic equipment constituting the projector having a reinforcement rib provided along the light emitting surface in the inside air outlet port,
   wherein the coupler is provided in a position corresponding to the reinforcement rib, with the electronic equipment being rested on the upper surface of the first bottom member.

9. A support apparatus comprising:
   a first supporter,
   wherein the first supporter has multiple first side plates which are disposed to face each other, and a coupler disposed between the multiple first side plates in a position spaced apart from an installation surface to couple the multiple first side plates together,
   wherein the coupler is configured to support a side surface of electronic equipment according to an installation angle of the electronic equipment to the installation surface, with the multiple first side plates facing each other in a thickness direction of the electronic equipment, and a second supporter configured to support the electronic equipment together with the first supporter by holding the side surface of the electronic equipment at a predetermined height, wherein a distance between the first supporter and the second supporter can be changed to thereby change the installation angle according to the distance.

10. The support apparatus according to claim 9, wherein the second supporter has multiple second side plates which are disposed to face each other and is configured to support the electronic equipment by holding the electronic equipment between the multiple second side plates in a thickness direction of the electronic equipment.

11. The support apparatus according to claim 9, wherein the second supporter has a second bottom member from which the multiple second side plates rise.

12. The support apparatus according to claim 11, wherein the second bottom member is installed on the installation surface and has an end surface which is formed into a convex arc shape which protrudes towards the installation surface.

13. The support apparatus according to claim 11, wherein the second supporter has an installation member installed on the installation surface and configured to support the second bottom member in a rotatable manner, the support apparatus further comprising:

a connection unit configured to connect the first supporter and the installation member together while being caused to extend and contract therebetween.

* * * * *